United States Patent [19]
Mangin et al.

[11] Patent Number: 6,078,890
[45] Date of Patent: Jun. 20, 2000

[54] METHOD AND SYSTEM FOR AUTOMATED HEALTH CARE RATE RENEWAL AND QUALITY ASSESSMENT

[75] Inventors: Christophe Mangin, Ann Arbor; Katherine Louise Taylor, Detroit, both of Mich.

[73] Assignee: Ford Global Technologies, Inc., Dearborn, Mich.

[21] Appl. No.: 09/088,034

[22] Filed: Jun. 1, 1998

[51] Int. Cl.[7] .................................................. G06F 17/60
[52] U.S. Cl. ........................................ 705/2; 705/3; 705/4
[58] Field of Search ................................. 705/2, 3, 1, 4; 283/54; 707/505, 506, 507, 508

[56] References Cited

U.S. PATENT DOCUMENTS

| | | |
|---|---|---|
| 4,831,526 | 5/1989 | Luchs et al. |
| 4,916,611 | 4/1990 | Doyle, Jr. et al. ............................ 705/2 |
| 5,410,646 | 4/1995 | Tondevold et al. ....................... 707/507 |
| 5,563,999 | 10/1996 | Yakisch et al. .......................... 707/507 |
| 5,640,577 | 6/1997 | Scharmer ................................. 707/507 |
| 5,655,085 | 8/1997 | Ryan et al. ................................. 705/4 |
| 5,664,207 | 9/1997 | Crumpler et al. ........................... 705/3 |
| 5,704,029 | 12/1997 | Wright, Jr. ............................... 707/505 |
| 5,774,887 | 6/1998 | Wolff et al. ............................. 707/508 |
| 5,819,274 | 10/1998 | Jackson, Jr. ............................. 707/505 |
| 5,890,129 | 3/1999 | Spurgeon .................................... 705/4 |
| 5,915,258 | 6/1999 | Toyokura ................................. 707/505 |

OTHER PUBLICATIONS

Thompson, Roger, "Switching to Flexible Benefits", Nation's Business, vol. 79, No. 7, p. 16, Jul. 1991.

Spitz, Lloyd G., "Streamlining Processes with Forms Automation", Best's Review—Life-Health Insurance Edition, vol. 95, No. 3, p. 86, Jul. 1994.

Stahl, Stephanie, "The Form Is In the (E)Mail: Electronic-Mail Based Forms Can Speed Workflow and Tighten Business Processes", InformationWeek, p. 42, ISSN: 8750–6874. Aug. 1994.

Bucci, Michael & Grant, Robert, "Employer–Sponsored Health Insurance: What's Offered; What's Chosen", Monthly Labor Review, vol. 118, No. 10, p. 38, Oct. 1995.

Drake, David F., "Managed Care: A Product of Market Dynamics", The Journal of the American Medical Association, vol. 277, No. 7, p. 560, Feb. 1997.

The MEDSTAT Group, "MEDSTAT Modeler Wins New Customers", Business Wire, Dialog File 16:Gale Group Promt, Jun. 6, 1997.

Noe, Jeffrey, "Purchasing Affordable Health Care Benefits", America's Community Banker, vol. 6, No. 7, p. 10, Jul. 1997.

Deloitte & Toiche, "Deloitte & Toiche's Value Equation Helps Companies Assess Total Health Plan Performance", Business & Health, vol. 15, No. 9, p. 63, Sep. 1997.

*Primary Examiner*—Emanuel Todd Voeltz
*Assistant Examiner*—John W. Hayes
*Attorney, Agent, or Firm*—David B. Kelley; Roger L. May

[57] ABSTRACT

A method is provided for automated managed health care enhanced rate renewal which utilizes a common electronic request package of specific and immutable format having locked embedded formulas to perform the necessary calculations and macros that tailor the package to suit information needs from individual providers. Submitted data is automatically compiled and stored in database using a data extraction tool integrated into the electronic form. The present invention advantageously allows evaluation of managed care providers for price and quality in a portfolio manner. In addition, the use of a common base electronic request form facilitates easy integration of data updates and modifications for all potential providers.

8 Claims, 1 Drawing Sheet

6,078,890

METHOD AND SYSTEM FOR AUTOMATED HEALTH CARE RATE RENEWAL AND QUALITY ASSESSMENT

TECHNICAL FIELD

The present invention generally relates to processing of price quote and coverage information supplied by multiple health benefit providers to permit employer qualitative evaluation as part of an overall purchasing price negotiation.

BACKGROUND ART

Generally, when paying health care benefits for employees, an employer may be faced with the annual task of negotiating new purchasing prices from potentially hundreds of different health care and dental care providers and associated products. The process for conducting such annual negotiating primarily involves each interested health care provider submitting price quote and coverage information to the employer for subsequent analysis and compilation.

Submission of price quote, coverage, and health care service history information has typically been performed using paper forms which further require employer personnel to manually copy the data into a resident computer system for the subsequent review, compilation and evaluation. In addition, each health care provider typically submits their respective information in a format of their own choosing.

Because the creation and processing of these forms is very labor intensive for both the providers and the employer, existing negotiating processes are highly inefficient and time consuming, particularly since the volumes of forms and information contained therein must be reviewed for errors, non sequiturs, insufficient and/or incomplete information. If any of these deficiencies are identified, the employer must seek clarification from the particular provider to supplement the previously received information. The fact that information must be manually copied from the submitted forms further increases the likelihood of human error or failure to fill out the forms with all necessary information.

In addition, centralized and automated administrative processing of such submitted forms is also difficult and labor intensive, particularly given the diversity of the various types of health care coverage and policy terms. Further, because the overall process is very time consuming, providers are required to submit all information well in advance of the actual rate renewal period. As a result, information regarding price quotes and other inherently transient factors conveyed by providers tends to be prospective, particularly with respect to price quotes which are estimated on the high side, and therefore introduces uncertainty and potential inaccuracy in employer quality assessments if rate information subsequently changes.

Therefore, a need exists for an improved method and system for collecting and processing health care provider information to increase efficiency and accuracy of managed care rate renewal in an abbreviated or timely manner.

DISCLOSURE OF THE INVENTION

It is therefore an object of the present invention to provide a method and system for automated employer collection and processing of managed care provider price quotes and quality information to facilitate analysis of such information and improve overall efficiency and timeliness of health care qualitative assessment for rate renewal negotiations.

In accordance with this and other objects, the present invention provides a method and system for automated collection and processing of health care rate and coverage information as part of an overall rate renewal process which includes a computer system arranged to perform the steps of generating a basic electronic request form having a plurality of locked and embedded data input prompts for all potential rate and coverage information of interest, receiving a request to negotiate from a particular health care provider, accessing a database to determine which of the plurality of data input prompts are relevant to the requesting provider, and customizing the basic electronic request form to include only the relevant locked and embedded data input prompts. The customized electronic form is then sent to the requesting provider for input and storage of the relevant data into specified data fields in the electronic form. After completion of the data input, the electronic form is then returned from the provider and loaded and compiled into a central database for subsequent rate renewal and qualitative analysis.

The above object and other objects, features and advantages of the present invention are more readily understood from a review of the attached drawings and the accompanying specification and claims.

BEST MODES FOR CARRYING OUT THE INVENTION

Figure 1:
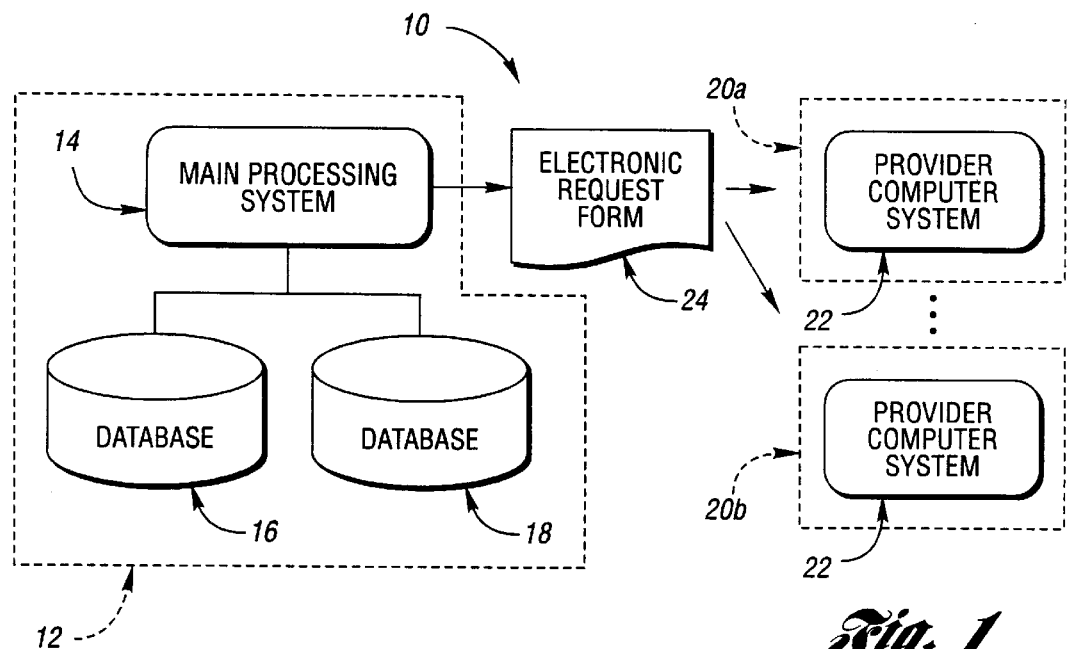
FIG. 1 is a block diagram illustrating the basic health care rate renewal system of the present invention.

Referring first to FIG. 1, a health care rate renewal system 10 in accordance with present invention includes at an employer or host location 12 a main processing system 14 formed from suitable computer hardware, a database 16 for storing all specific provider price quote, coverage, and quality assessment information, and a database 18 for storing a basic electronic request form and all electronic request customization information. Databases 16 and 18 are preferably implemented as a centralized database for system 10. In addition, while represented as different entities, it will be appreciated that databases 16 and 18 could be maintained within a single data storage device or common storage media.

As further shown, employer location 12 communicates with at least one of a plurality of Health care provider locations 20(a)–20(b). Such communication can utilize any form, such as via personal correspondence, telephone, or an electronic interconnection like an Internet link. Each provider location 20 would include a terminal 22, such as implemented in the form of a computer system, and one or more suitable database or memory devices for maintaining rate, quality and coverage information concerning an employer's participating employees.

Figure 2:
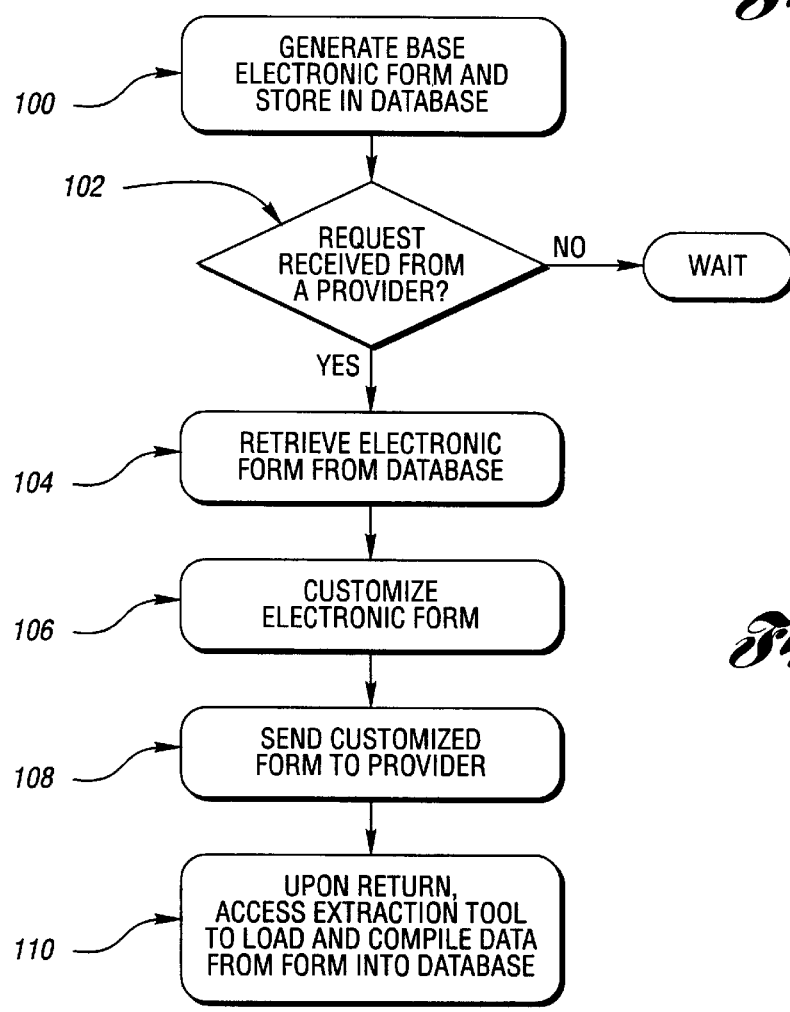
FIG. 2 is a flowchart illustrating the method of automated price quote and coverage information in accordance with the present invention.

Referring now to FIG. 2, a flowchart illustrates a method for automated collection and compilation of relevant rate and coverage information in accordance with the present invention. More specifically, a generic or base electronic request form 24 is generated at block 100 using a suitable programming language and stored for subsequent recall and modification as described below in any manner known to one of ordinary skill in the art. The electronic request form is preferably implemented in a software package which can then be subsequently run by a given computer system in order to allow information to be input or extracted as described below.

The base electronic form is generated as a data input template which will prompt a provider to input all necessary information relevant to evaluating and negotiating rate renewal for a given year. For example, calculation of managed care price proposals differ in structure depending on a myriad of complex factors such as provider type (e.g., HMO, PPO, DMO, or SSPPO), type of coverage being offered (e.g., medical, hearing, vision, dental, or drug), employee work status (e.g., active or retired), and medicare eligibility. The base electronic form is generated using a single format to be applied to all health care providers and includes suitable locked and embedded prompts and formulas which step a provider through inputting all relevant data into specialized data fields and to automatically make all necessary calculations. In the preferred embodiment, the formulas are included in the programming so that respective formulas are inaccessible to the provider, while the results, e.g., a determination of monthly total composite rate, are displayed to the provider within the electronic form. The provider may selectively print and electronically save their respective request form as a data file.

In addition, the electronic form includes suitable macros or equivalent programming mechanism available to one of ordinary skill in the art which permit the electronic form to be easily customized or tailored to satisfy the specific information needs of a particular provider. For example, information prompts for medical or vision rate and coverage information would not be relevant for a DMO (dental health maintenance organization) provider, and thus the base electronic form could be modified or tailored as needed to simplify completion for a given provider.

In further accordance with the present invention, a data extraction tool is included in the programming of the electronic form so as to facilitate automatic retrieval of provider data for compilation as external data sets in database 16 upon submission of a completed electronic form from a provider. The integrated data extraction tool eliminates the need for manual re-entry of data submitted by a provider, thereby reducing the potential for erroneous data entries.

In the preferred embodiment, storing data in database 16 provides a centralized engine and processing capability to allow easy employer access and updating of all provider information. Further, the electronic form is programmed so that when executed by the employer, all data and calculations are automatically performed again using the most current information stored in database 16. As a result, the electronic form is preferably programmed to operate as a "living" or dynamic information accumulator, i.e., provider information is not simply input once and thereafter requires resubmission of a new form every time information changes.

Such a dynamic or "living" format not only facilitates easier data management and processing, but also allows the employer to easily modify different factors and analyze the resulting ramifications for many different hypothetical situations. The ability to project likely results for numerous different scenarios is a very powerful analytical tool which improves the overall rate renewal negotiation process.

Referring back to FIG. 2, as shown at block 102, a request for rate renewal negotiation is received from a provider, and in response thereto the base electronic request form is generated from database 18 at block 104 and customized at block 106 based on an analysis of the specific requesting provider. The customized electronic form is then sent to the requesting provider at block 108 such as via a portable data floppy disk or equivalent device, or as a data file transmitted via a modem and suitable communication link.

Upon receipt, the provider will load the electronic form into computer system 22 and enter all required data into the electronic form software package. The electronic form can further be implemented to penalize providers who do not enter all required information such as by automatically inserting predetermined default responses. In addition, the electronic form can include programming that analyzes the form to determine whether the provider failed to fully input all requested data into the form. An alert is provided to inform the provider of such a failure before the electronic form is returned.

Upon return submission of a completed electronic request form, the form is loaded into main processing system 14. At block 110, the integrated extraction tool would be accessed and run to load all provider data stored in the electronic form into database 16.

Thus, the present invention provides an automation process utilizing a common electronic request package of specific and immutable format having locked embedded formulas to perform the necessary calculations and macros that tailor the package to suit information needs from individual providers. The process of the present invention advantageously allows an opportunity to evaluate managed care providers for price and quality in a portfolio manner. In addition, the use of a common base electronic request form facilitates easy integration of data updates and modifications for all potential providers.

Further, the automated input of submitted data into a centralized database 16 allows efficient and reliable archiving of the demographic, price, and quality data, thereby permitting compilation of data to create a historical provider-profile memory and tracking of short and long term annual trends. It follows that the quality of the rate renewal negotiation process itself can also be monitored as well as the quality, price and demographic profiles of the providers.

Finally, because of the generic format and automated processing provided by the present invention, the overall time needed to collect and analyze provider information is significantly shortened. Shortening the time needed to collect provider information further improves the qualitative value analysis because provider information can be collected at a time much closer to the applicable coverage term, thereby eliminating speculation and uncertainties regarding accuracy of provider information.

It is understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed is:

1. A method for automated collection and processing of health care rate, quality, and coverage information as part of an overall rate renewal process comprising:

generating a base electronic request form having a plurality of locked and embedded data input prompts for all potential rate, quality and coverage information of interest;

receiving a request to negotiate from a particular health care provider;

accessing a database to determine which of the plurality of data input prompts are relevant to the requesting provider;

customizing the basic electronic request form to include only the relevant locked and embedded data input prompts, wherein the relevant locked and embedded data input prompts are selected based on the type of provider requesting negotiation;

sending the customized electronic form to the requesting provider for input and storage of the relevant data in the electronic form; and reading the electronic form for automated compiling and storing into a database all data input into the electronic form after return submission of the electronic form from the provider, wherein the stored data is available for subsequent rate renewal analysis.

2. The method of claim 1 wherein the data input into a returned electronic form is stored in a central database.

3. A method for automated collection and processing of health care rate, quality, and coverage information as part of an overall rate renewal process comprising:

generating a base electronic request form having a plurality of locked and embedded data input prompts for all potential rate, quality and coverage information of interest;

receiving a request to negotiate from a particular health care provider;

accessing a database to determine which of the plurality of data input prompts are relevant to the requesting provider;

customizing the basic electronic request form to include only the relevant locked and embedded data input prompts, wherein the relevant locked and embedded data input prompts are selected based on the type of provider requesting negotiation;

sending the customized electronic form to the requesting provider for input and storage of the relevant data in the electronic form;

reading the electronic form for automated compiling and storing into a database all data input into the electronic form after return submission of the electronic form from the provider for subsequent rate renewal analysis; and subsequently regenerating a returned electronic form, and retrieving the most recently stored provider information from the database for insertion into the regenerated form.

4. The method of claim 1 further comprising detecting that a provider has failed to fully input all requested data into the request form, and alerting the provider of such a failure before the provider returns the electronic form.

5. A system for automated collection and processing of health care rate, quality, and coverage information as part of an overall rate renewal process comprising:

a processor for generating a base electronic request form having a plurality of locked and embedded data input prompts for all potential rate, quality and coverage information of interest;

a first database for storing data necessary for generating the base form, said processor arranged to access the first database upon receiving a request to negotiate from a particular health care provider to determine which of the plurality of data input prompts are relevant to the requesting provider, and to customize the basic electronic request form to include only the locked and embedded data input prompts relevant to a particular type of health care provider requesting negotiation; and a second database for storing all received health care provider data, said processor further arranged to read a completed customized electronic form from a requesting provider and to automatically compile and store into the second database all data input into the electronic form by the provider for subsequent rate renewal value analysis.

6. The system of claim 5 wherein the first and second databases comprise a central database.

7. The system of claim 5 wherein said processor is further arranged to subsequently regenerating a returned electronic form upon request, and retrieve the most recently stored provider information form the second database for insertion into the regenerated form.

8. The system of claim 5 wherein the electronic form is arranged to automatically detect that a provider has failed to fully input all requested data into the request form, and alert the provider of such a failure before the provider returns the electronic form.

* * * * *